United States Patent Office 3,565,981
Patented Feb. 23, 1971

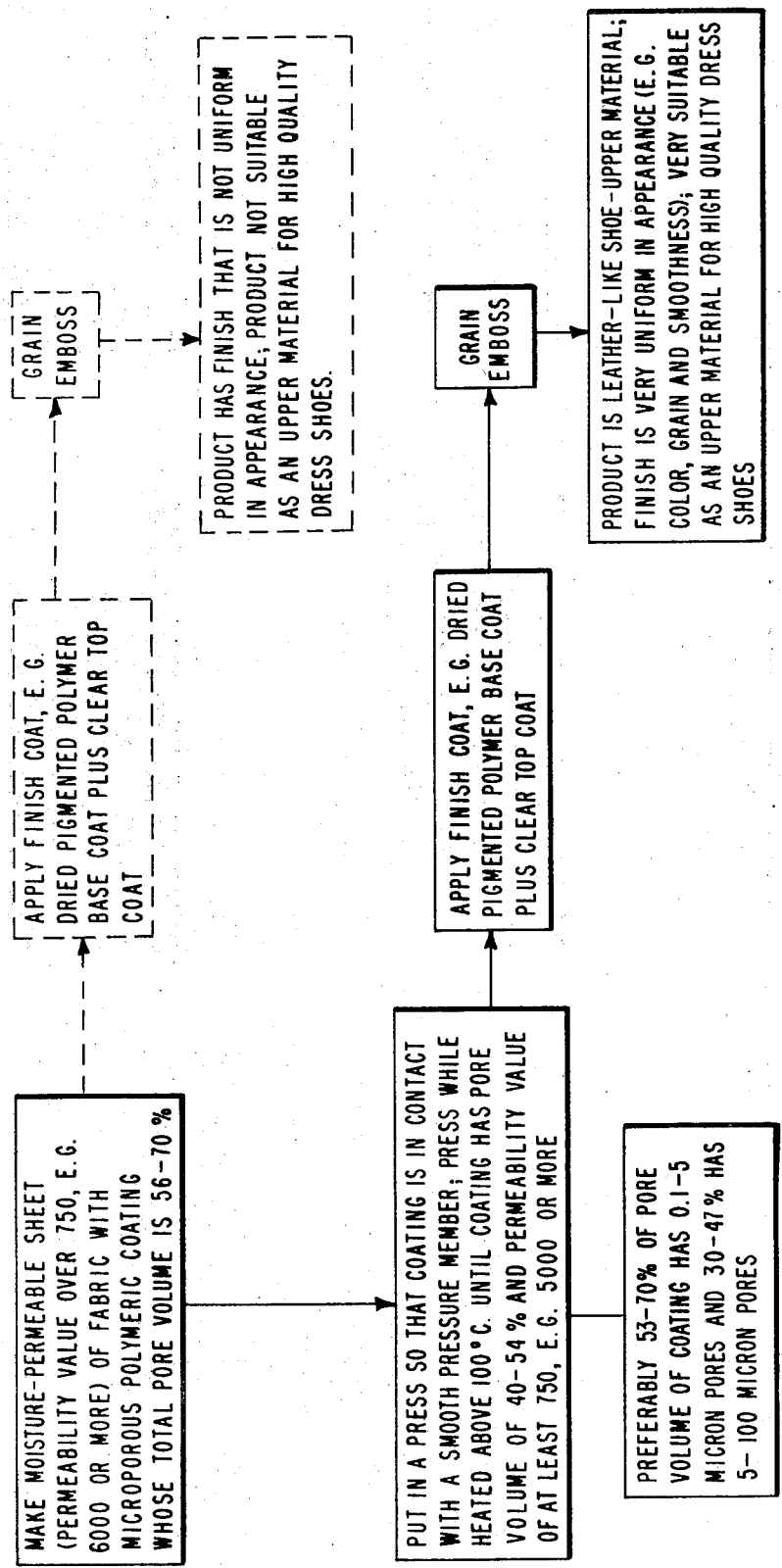

3,565,981
PROCESS FOR PREPARING A COMPOSITE MOISTURE-PERMEABLE SHEET MATERIAL
Michael R. Lauro, Madison, Tenn., assignor to E. I. du Pont de Nemours and Company, Wilmington, Del., a corporation of Delaware
Filed May 9, 1967, Ser. No. 637,080
Int. Cl. B29d 3/02, 27/04
U.S. Cl. 264—45                4 Claims

ABSTRACT OF THE DISCLOSURE

A leather-like shoe-upper material useful for the manufacture of high quality dress shoes is prepared by first making a moisture-permeable sheet material having a layer of microporous polymeric composition in superposed adherence with a fibrous substrate such as a single or multiple layer fabric, said layer of composition having a pore structure which makes it impossible to obtain a uniform-appearing finish under practical manufacturing conditions when one of more finish coats is applied and the coated surface is grain-embossed; then the sheet material is subjected to heat and pressure under carefully regulated conditions until the pore structure of said layer of composition is modified and consolidated to such an extent that the surface can be finish-coated and grain-embossed to provide a product having not only satisfactory breathability but also outstanding uniformity in such critical appearance properties as color, grain pattern and smoothness.

BACKGROUND OF THE INVENTION

This invention relates to a process for preparing a composite sheet material, particularly a sheet material useful in the manufacture of breathable shoe-uppers.

It is known that leather-like sheet materials useful as breathable shoe-upper materials can be prepared by coating fibrous web substrates such as fabrics and the like with certain porous polymeric materials. It is also known that the preparation of such sheet materials usually includes finishing operations comprising:

(a) Dyeing the sheet material to the desired color in a dye bath,
(b) Drying the dyed sheet material,
(c) Applying to the upper surface of the sheet material one or more layers of pigmented and/or clear finishing composition containing a polymer dispersed in a liquid,
(d) Drying the finishing composition, and
(e) Embossing the upper surface of the finish-coated sheet material to give it the desired surface characteristics such as sheen and configuration (e.g., leather-like grain pattern), for example by passing the sheet material at an elevated temperature between a pair of rotating pressure rolls so that said upper surface receives the grain pattern and/or sheen of the upper roll. The embossing to provide a grain pattern is sometimes referred to in the art as the "graining" operation.

Among the problems which have been encountered in the prior art methods of preparing such sheet materials, especially when attempting to make large quantities of the product in uniform quality, are the following:

(1) The edges of the sheet material tend to curl up as it is passed from one finishing operation to another, particularly during and after the finish-coating and finish-drying operation; this edge-curl problem leads to non-uniform application of the finishing composition and makes it more difficult and costly to transfer the sheet material in a suitable manner from one stage of the process to another.

(2) Even when costly measures are taken to hold the sheet material flat as it passes from one finishing operation to another, the sheet material tends to have a non-uniform color and appearance after the application of the finishing composition; this appears to be due to the fact that the sheet material varies from one area to another with respect to the speed of absorption and the amount of absorption of the finishing composition.

(3) The surface of the sheet material often lacks the desired smoothness after completion of the above-mentioned finishing operations; an orange-peel roughness pattern and other surface defects are quite common.

(4) In the embossing operation which follows drying of the finishing composition, the accuracy with which the grain pattern or sheen of the embossing roll is transferred to the surface of the sheet material tends to vary quite noticeably from one portion of the sruface to another; also it has been difficult to manufacture a product having the high degree of sheen desired in certain applications.

Attempts to use more severe pressing conditions in the graining or embossing operation not only fail in most cases to overcome these problems, but also introduce additional problems, such as undesirable reduction in breathability, flex life, and comfort characteristics such as softness and porosity of the lower surface of the product which forms the inner surface of shoes made from it.

SUMMARY OF THE INVENTION

In a broad sense, the novel process of this invention (sometimes referred to below simply as "the process") may be defined as a process for preparing a composite sheet material having utility in the manufacture of breathable shoe-uppers which comprises:

(A) Providing a flexible moisture-permeable sheet material having a permeability value of more than 750 and comprised of a porous fibrous substrate having in superposed adherence therewith a layer of microporous polymeric composition, said layer having a total pore volume of about 56–70%, and (B) Subjecting said sheet material to pressure between a pair of pressure members while the sheet material is at an elevated temperature above 100° C. and while the upper surface of the sheet material is in contact with a smooth pressure member until the total pore volume of said layer is reduced to a value of about 40–54%,
said pressure being removed before the permeability value of said sheet material falls below 750.

The permeability value is determined by the test described by Kanagy and Vickers in the Journal of American Leather Chemists Association, 45, 211–242 (Apr. 19, 1950).

The best results are usually obtained when the process is carried out in such a manner that said layer in step (A) has about 46–50% of its pore volume composed of pores having an average cross-section diameter of about 0.1–5 microns, and about 50–54% of its pore volume composed of pores having an average cross-section diameter of about 5–100 microns;

and said layer in step (B) has about 53–70% (preferably about 54–60% of its pore volume composed of pores having an average cross-section diameter of about 0.1–5 microns, and about 30–47% (preferably about 40–46%) of its pore volume composed of pores having an average cross-section diameter of about 5–100 microns.

The total pore volume and the size of the pores are determined by the well-known mercury intrusion (penetration) method, for example according to the general procedure described in "Pore Size Distribution by Mercury Penetration" by Winslow and Shapiro in the A.S.T.M. Bulletin, February 1959.

It is well-known that unfinished natural leather as obtained from the tanneries is a useful article of commerce. Likewise, a product resulting from a process consisting only of steps (A) and (B) as defined above is a very useful article of commerce. Thus, large rolls or bales of the product can be shipped to firms which specialize in carrying out the finishing operations which render the product especially suitable for the particular needs of various manufacturers of shoes, luggage, upholstered articles and the like. Or the product can be shipped directly to a shoe factory having its own finishing department. Those who finish the product and those who use it will experience the valuable results of the invention as described later.

BRIEF DESCRIPTION OF THE DRAWING

A flow sheet of an embodiment of the novel process is shown in the attached drawing. The portion of the drawing shown in broken lines illustrates a prior art process. The drawing will be better understood after reading the examples given below.

DESCRIPTION OF PREFERRED EMBODIMENTS

A preferred method for carrying out step (A) of the process comprises:

(1) Applying to a porous fibrous substrate a layer of a liquid polymeric composition comprised of a polymer dispersed in a liquid comprising an organic solvent, and capable of being solidified in situ to form a microporous structure when bathed and dried according to steps 3 and 4 below, (2) Exposing said layer of liquid composition to a humid-air zone having a suitable relative humidity (e.g., 40%) and temperature (e.g. 26° C.) until said layer has absorbed enough water to cause at least the uppermost portion of the layer to undergo an initial coagulation reaction, (3) Bathing said layer with a bathing liquid adapted to extract the organic solvent from said composition until substantially all of said solvent is extracted, and (4) Drying the resulting composite sheet material. At least the last portion of the bathing step preferably employs a bathing liquid which can easily be removed from the sheet material by evaporation in a heat zone.

An especially useful liquid polymeric composition to apply to the substrate in the practice of this method is a substantially colloidal polymeric dispersion which has been prepared by adding a nonsolvent to a polymer solution according to the method described in claim 1 of U.S. Pat. 3,100,721 issued Aug. 13, 1963 to E. K. Holden. The disclosure of this patent is incorporated herein by reference. Among the polymers useful in practicing the present invention are those described in this Holden patent (e.g., see column 3, line 19 to column 6, line 63).

The fibrous substrate of the sheet material provided in step (A) of the process is preferably a nonwoven fabric or a woven fabric, or a composite fabric having a woven fabric in superposed relation with a nonwoven fabric. One very useful nonwoven fabric is one containing a solidified polymeric impregnant having a porous moisture-permeable structure; such a fabric can be prepared, for example, by the procedure described in Example 1 of U.S. Pat. 3,067,483 issued Dec. 11, 1962 to J. L. Hollowell. Among the other useful substrates are porous fibrous sheets prepared by paper-making techniques, and natural and man-made suede materials.

The thickness of the layer of microporous polymeric composition on the substrate is preferably about 5–35 mils just before step (B) and about 4–30 mils just after step (B); particularly preferred is a thickness of about 10–21 mils before and about 8–18 mils after step (B). Usually the layer of microporous composition undergoes an increase in density of about 7–15% during step (B).

In some preferred embodiments of the process, about 65–95% of the larger pores (average cross-section diameter of about 50–100 microns) of the layer of microporous composition described in step (A) are in the lower half of said layer. In some of the most useful known methods of providing a moisture-permeable sheet material having a layer of microporous polymeric composition in superposed adherence with a porous fibrous substrate, it is a common experience to obtain a structure wherein there are numerous large pores (e.g., 50–100 micron pores) in the lower portion of the microporous layer; such pores are especially prevalent in the bottom 1/10 to 3/10 of the layer. Although applicant does not wish to be held to any particular theory, it is believed that the presence of these large pores is an important factor in the costly finishing problems so often encountered in known methods of manufacturing man-made shoe-upper materials.

The pressing conditions employed in carrying out step (B) are preferably such that the fibrous substrate undergoes little or no permanent increase in density. Preferred pressing conditions are described below. If a given set of pressing conditions result in an undue increase in density of the substrate, this can be overcome by a slight reduction in temperature, pressure and/or dwell time. It is quite unexpected that the beneficial results of the present invention can be achieved under pressing conditions that are most effective in overcoming the finishing problems discussed above and without causing any undue increase in the density of the porous substrate or any undue decrease in the breathability of the product.

The sheet material provided in step (A) is preferably dyed to the desired color and dried prior to step (B). The desired color is usually a color which is the same or similar to the color of the finish-coating composition applied after step (B); for example, in the manufacture of an upper material for brown shoes, a brown dye and a brown coating composition are used. Methods known to be useful for dyeing fabrics and the like can be employed to dye the sheet material. A preferred dyeing procedure is illustrated in Example 1.

In a preferred embodiment of the process, the sheet material which has been dyed and dried and then modified under heat and pressure in accordance with step (B) as described above is subjected to a finishing operation which comprises:

applying to the upper surface of the sheet material at least one layer of coating composition containing a polymer dispersed in a volatile liquid, drying the layer of coating composition, and passing the coated sheet material through an embossing apparatus under conditions sufficient to provide the upper surface of the sheet material with the desired sheen and/or grain pattern or other configuration.

One skilled in the art, after reading the present disclosure, will have little difficulty in selecting the pressing conditions to be employed in step (B) of the process of this invention that will give the most beneficial results.

In some preferred embodiments of the process, step (B) is carried out by subjecting the sheet material provided in step (A) to a pressure of about 8–15 (preferably about 10–14) pounds per square inch gage pressure (p.s.i.g.) for a period of about 4–15 seconds (preferably about 8–10 seconds) while at least the layer of microporous composition on top of the substrate is at a temperature of about 150–170° C. This type of pressing operation is preferably performed by passing the sheet material under the conditions specified above through an apparatus of the type described in U.S. Pat. 3,157,723 issued Nov. 17, 1964 to J. Hochberg. The roll which contacts the upper surface of the sheet material preferably has a very smooth surface, for example, a lustrous chrome or stainless steel surface. Useful results are also obtainable when this roll has been engraved to provide a fine leather-like grain pattern or the like.

In other preferred embodiments of the process, step (B) is performed by subjecting the sheet material provided in step (A) to a pressure of about 15–35 (preferably about 20–30) p.s.i.g. for a period of about 0.5–3 (preferably about 1–2) seconds while at least the layer of porous composition on top of the substrate is at a temperature of about 170–190° C. This type of pressing operation is preferably carried out by passing the sheet material under the conditions specified above through the nip of a pair of pressure rolls, the roll in contact with the bottom (substrate side) of the sheet material having a resilient surface (e.g., a thick rubber coating), and the roll in contact with the top surface of the sheet material having a very smooth surface, for example, a shiny metallic surface. Useful results are also obtained when the latter roll has been engraved with a fine grain pattern or the like. The resilient roll is preferably resilient enough, and both of the rolls large enough, so that a nip is formed having a length of about 3–7 inches in the direction of travel of the sheet material under the pressure to be used in the process. This elongated nip provides sufficient dwell time for the essential modification of the layer of microporous composition while the sheet material travels through the nip at a relatively rapid speed. When using this type of pressing procedure, it is usually advisable to preheat the sheet material to approximately the temperature to be used during the pressing step just before the material enters the nip, for example, by passing the sheet material over a large heated roll or through an oven.

Step (B) can also be performed by using other known types of presses capable of causing the required modification of the layer of microporous composition. For example, the sheet material provided in step (A) can be subjected to a pressure of about 10–14 p.s.i.g. for about 4–15 seconds at a temperature of about 150–170° C. in a flat-platen press wherein the lower flat pressure member is a steel plate covered with a resilient sheet of rubber or a resilient inflated plastic enclosure shaped about like an ordinary hot-water bottle, and the upper pressure member is a polished sheet of stainless steel.

When using a substrate comprised of a woven fabric on top of a nonwoven fabric, the sheet material provided in step (A) of the process is preferably prepared in such a manner that it contains a mass of microporous moisture-permeable flexible polymeric composition which not only forms a smooth coating in superposed adherence with the fabric, but also penetrates the pores of the woven fabric and penetrates the pores of at least the uppermost portion of the nonwoven fabric whereby the coating and the fabrics are integrally bonded together. This can be accomplished for example by carrying out step (A) as follows:

(a) providing a nonwoven substrate fabric,
(b) providing a woven fabric,
(c) providing a liquid polymeric composition comprised of a polymer dispersed in a liquid comprising an organic solvent, and capable of being solidified in situ to form a microporous structure when bathed and dried according to (e) and (f) below,
(d) forming a composite assembly from the components provided in steps (a), (b) and (c) so that the woven fabric is in superposed relation with said nonwoven fabric, and so that there is a continuous body of said liquid polymeric composition forming a coating on the top surface of the woven fabric and penetrating the pores of the woven fabric plus the pores of at least the uppermost portion of the nonwoven fabric, said coating being of sufficient thickness so that after step (f) it is thick enough to render the surface pattern of the woven fabric substantially invisible to the unaided eye,
(e) bathing the liquid polymeric composition of the composite assembly with a liquid coagulant adapted to extract the organic solvent from said composition until substantially all of said solvent is extracted, and
(f) drying the composite assembly;

steps (e) and (f) causing said composition to solidify in situ and become a microporous moisture-permeable structure which forms an adherent coating on the top surface of the resulting moisture-permeable composite article and which bonds said fabrics together.

In a preferred embodiment of the process described in the previous paragraph, step (d) is carried out by:

placing said woven fabric in superposed contact with said nonwoven fabric to form a composite fabric,
applying a layer of said liquid polymeric composition on the top surface of the composite fabric, and
allowing the lower portion of the layer of liquid polymeric composition to flow downward (e.g., with the aid of suction applied to the bottom of the assembly) until it penetrates the pores of the woven fabric and the pores of at least the uppermost portion of the substrate fabric as well as any voids between the two fabrics.

Preferred embodiments of the process of this invention are further characterized by one or more of the following features:

(1) During step (B), the microporous coating undergoes a reduction in thickness of about 1–5 mils, preferably about 2–3 mils.

(2) The sheet material provided in step (A) has a permeability value of at least 1500, and after step (B) the sheet material has a permeability value of at least 1000.

(3) The sheet material provided in step (A) has a permeability value of at least 6000, and after step (B) the sheet material has a permeability value of at least 5000.

(3a) The total pore volume of said layer of microporous composition before step (B) is about 56–60%, and after step (B) is about 50–54%.

(4) The polymeric composition used in forming the layer of microporous composition in step (A) has a secant tensile modulus at 5% elongation (defined below) of over 600 p.s.i., preferably about 800–3000 p.s.i.

(5) The polymeric composition used in forming the layer of microporous composition in step (A) contains about 51–100% by weight of a polyurethane polymer and up to about 49% by weight of a vinyl chloride polymer.

(6) The sheet material provided in step (A) has a liquid absorption-rate value (defined below) of about 5–10 (preferably about 7–8), and after step (B) the sheet material has a liquid absorption-rate value of about 1–4 (preferably about 1.8–2.8).

(7) The sheet material provided in step (A) has a roughness value (defined below) of about 130–220 (preferably about 160–190), and after step (B) the sheet material has a roughness value of about 45–105 (preferably about 65–85).

(8) During step (B) the microporous coating undergoes an increase in density of about 10–12%.

(9) During step (B) the layer of microporous composition is at a temperature at least equal to its softening temperatures but below its decomposition temperature.

The secant tensile modulus mentioned above in item (4) is the ratio of the stress to the strain at 5% elongation of the polymer sample determined from the tensile stress-strain curve, and is expressed as force per unit area, e.g., pounds per square inch (often expressed as p.s.i.). The secant tensile modulus measurement is carried out according to ASTM D–882–64–T, modified as described below.

The secant tensile modulus of the polymer is determined by forming a 5 to 20 mil thick continuous void-free polymer film from a polymeric solution, for example, the solution to be used to form the microporous polymeric layer of the sheet material of this invention. The film is formed by casting the polymeric solution on a glass plate and the solution is then dried, e.g., at 105° C. for 90 minutes.

The stress-strain curve which is necessary to calcuate the secant tensile modulus of the polymer is preferably obtained on an Instron Tensile Tester, using a ½ inch wide specimen cut from the void-free polymeric film, with about one inch between grips. The following settings are preferably used on the Instron Tester to obtain a stress-strain curve: chart speed of 10 inches per minute, crosshead speed of 1 inch per minute, and a full scale load of 2 to 5 pounds.

The secant tensile modulus is obtained from the chart of the force vs. strain curve by drawing a line at 5% specimen elongation (strain) parallel to the force axis of the chart. The point at which this line intersects the force/strain curve defines the force in pounds necessary to elongate the specimen 5%. This force value is divided by the initial cross-sectional area of the specimen to give the corresponding stress value in pounds per square inch. This stress value is divided by the strain (0.05) to give the secant tensile modulus.

The liquid absorption-rate value mentioned in item 6 above is determined by placing a small sample of the sheet material on a laboratory balance so that the microporous layer is at the top, weighing the sample, applying a drop of liquid to a certain point in the surface of the microporous layer, the liquid being a mixture of 95 parts of water and 5 parts of dimethyl formamide at 25° C., getting the weight of the drop of liquid in milligrams, measuring the time it takes for the drop of liquid to be completely absorbed by the microporous layer, measuring the area of the surface which has been wet by the liquid, and recording the milligrams of the liquid absorbed in one minute by 1 square inch of surface (mgs./sq. in./minute) as the liquid absorption-rate value for that one small area of the surface; this procedure is repeated at representative areas along the length and width of the product's surface and an average is taken as the liquid absorption-rate value of the product.

The roughness value mentioned in item 7 above is determined by ASA Method B–46.1 (1955), using a Brush No. 150 Surface Analyzer equipped with a 0.5 gram diamond probe having a 0.0001 inch radius, and using a 0.3 inch cut-off; the result is expressed in terms of an arithmetical average (A.A.); the test procedure is repeated at several representative areas along the length and width of the product's upper surface and an average is taken as the roughness value of the product.

Composite leather-like sheet materials are obtainable in accordance with the present invention having utility in the manufacture of breathable shoe-uppers, upholstery material and the like, and having such important beneficial properties as the following:

Substantially no curling up of the edges as the sheet material is subjected to various finishing operations, and is passed from one finishing operation to another under large-scale manufacturing conditions; as a result of this advantage, it is not at all uncommon to experience a great reduction in cost and a substantial increase in quality of the end product;

Surprisingly uniform color and appearance after the application and drying of the finishing composition;

Excellent surface smoothness along the entire length and width of the product both before and after the finishing operations that follow step (B);

Capacity to accept the grain pattern and/or sheen of the embossing roll with a high degree of accuracy and uniformity following the application and drying of the finishing composition;

Good breathability and flex life of the product combined with good softness and porosity of the lower surface of the sheet which forms the inner surface of shoes made from it.

As a result of the advantages mentioned above, it is common to obtain a marked increase in the percentage of the product leaving the end of the production line which is capable of passing inspection as satisfactory for use in high quality shoes and other products.

In the practice of this invention, the sheet material often has a higher permeability value after the usual finish-coating and final embossing or graining operation than control samples made in the same manner except for the omission of step (B) of the present process. This is a completely unexpected beneficial result.

The examples which follow are given for the purpose of illustrating the invention. All quantities shown are on a weight basis unless otherwise indicated.

Example 1

A roll of composite leather-like sheet material having a length of 800 feet and a width of 65 inches, and having beneficial utility as a breathable shoe-upper material for high quality men's shoes, is prepared by:

(1) Providing a nonwoven substrate fabric which (a) has ben made from polyester fibers, (b) contains as a solidified polymeric impregnant a polyurethane elastomer having a porous moisture-permeable structure, (c) has been prepared generally in accordance with the teachings of Example 1 of U.S. Pat. 3,067,483 (mentioned above), (d) has a thickness of 50 mils, a density of 0.38 gram per cubic centimeter, a width of 65 inches and a length of 800 feet, and (e) has ben wound up on a storage roll;

(2) Providing a woven blended-fiber fabric of a type commonly used in making men's shirts, which fabric (a) has been made from yarns composed of 65% polyester fibers (polyethylene terephthalate) and 35% cotton fibers, (b) has a thickness of 5.5 mils, a weight of 2.3 ounces per square yard, a thread count (of the as-woven fabric) of 96×96 (warp×fill), a width of 65 inches and a length of 800 feet, (c) has ben scoured until free of processing lubricant, sizing and other foreign matter, (d) has been bleached and double-singed on each side, and (e) has been stretched while wet from an initial width of 62.5 inches to a final width of 65 inches and then dried while in the stretched condition in a conventional tenter-frame oven before being wound up on a storage roll;

(3) Providing a liquid polymeric composition in which the polymer component has a secant tensile modulus at 5% elongation of about 1200 p.s.i., and which has been prepared by (a) making a blended polymer solution consisting of 12.9% polyurethane elastomer, 4.3% polyvinyl chloride and 82.8% dimethylformamide according to the following procedure: a 20% solution of polyurethane elastomer is prepared according to the procedure described in U.S. Pat. 3,284,274, column 11, lines 57–75, which patent issued Nov. 8, 1966 to Hulslander et al.; then the blended polymer solution is prepared by admixing a 12% solution in dimethylformamide of polyvinyl chloride with a suitable amount of the polyurethane solution; (b) converting the resulting solution to a substantially colloidal dispersion by gradually adding a 1:4 blend of water and dimethylformamide to the solution while stirring until the mixture has a water content of 4.0%, and (c) adjusting the temperature of the resulting composition to 27° C.;

(4) Combining the resulting two fabrics and the liquid polymeric composition into a composite sheet material which (a) contains the woven fabric resulting from step 2 in superposed relation with the nonwoven fabric described in step (1), (b) has a thin layer of the liquid polymeric composition in interposed contact with the two fabrics, but not necessarily a continuous layer since the fabrics usualy touch each other at numerous points, (c) has a 65 mil-thick layer of the liquid polymeric composition on the top surface of the woven fabric, (d) contains the liquid polymeric material within the pores of both fabric layers, (e) is prepared by placing the woven fabric in superposed contact with the non-woven fabric to form a composite fabric by simultaneously passing both fabrics over a common roller, applying the liquid polymeric composition at 27° C. to the resulting composite fabric by means of a doctor-knife coating apparatus in an amount sufficient to end up with the above-mentioned 65-mil-thick layer on the top surface, and subjecting the bottom surface of the composite fabric to suction (10 inches of mercury) for ½ second by means of a vacuum pump, thereby causing the lower portion of the liquid polymer layer to impregnate the woven fabric and the upper portion of the nonwoven fabric while retaining a 65-mil wet-layer thickness on top of the woven fabric;

(5) Passing the resulting composite sheet material coating-side-up at a speed of 20 feet per minute through a humidity chamber for a period of 40 seconds wherein the relative humidity is 40% and the temperature is 26° C., thereby causing the liquid layer to undergo a partial coagulation reaction as a result of its exposure to the moisture in the chamber;

(6) Bathing the liquid polymeric composition of the resulting composite assembly by (a) immersing the assembly in a tank containing water at 18° C. for 9 minutes, (b) immersing the assembly in a tank containing water at 65° C. for 9 minutes, and (c) passing the sheet over a rotary vacuum drum provided with a supply of clean rinse water at a temperature of 80° C., thereby completing the coagulation of the polymer and the leaching therefrom of organic solvent, step (6) causing the liquid polymeric composition to solidify in situ and become a microporous moisture-permeable structure which forms not only a smooth, durable, adherent coating on the top surface of the sheet material but also a strong bonding layer which integrally adheres the two fabrics together;

(7) Dyeing the sheet material brown by (a) dipping it in water at 94° C. for 20 seconds, (b) passing it between a pair of nip rolls to reduce the water content to 40%, (c) dipping it for one minute in a brown aqueous dye bath having a pH of 10.2 and a temperature of 94° C., and containing 3% of a brown dye (CI 20110), (d) passing it between a pair of rubber-covered nip rolls under a pressure of 75 pounds per inch (width of the sheet), (e) dipping it for 80 seconds in an aqueous dichromate solution having a temperature of 94° C. and containing 4 grams per liter of sodium dichromate and 2 grams per liter of acetic acid, (f) passing it between a pair of nip rolls under a pressure of 125 pounds per inch, (g) dipping it in water at 94° C. for 4 minutes, (h) passing it between a pair of nip rolls at 125 pounds per inch, and (i) drying the dyed sheet in an oven at 121° C. for 5 minutes; the sheet material now having a permeability value of 8900, and a 15-mil-thick layer of microporous polymeric composition on top of the woven fabric which has a liquid absorption-rate value of 7.4 (determined as described above), a roughness value of 170, and a total pore volume of 58.2%, about 48.0% of said pore volume consisting of small pores having an average cross-section diameter of about 0.1–5 microns, about 52.0% of said pore volume consisting of larger pores having an average cross-section diameter of about 5–100 microns, and the majority of the pores having a diameter of about 50–100 microns being in the lower ¼ to ½ of said layer;

(8) Modifying the characteristics of the dyed and dried sheet material in accordance with step (B) of the process of this invention as described previously by subjecting the sheet material to a pressure of 13 p.s.i.g. for a period of 9 seconds while at least its upper surface is at a temperature of 160° C.; step (8) is performed by passing the sheet material at a speed of 10 feed per minute through an apparatus generally the same as described as the preferred embodiment in U.S. Pat. 3,157,723 so that the upper surface of the sheet material is in contact with about half of the circumferential surface of a 12-inch-diameter roll having a surface temperature of 160° C. and having a very smooth, lustrous ("mirror finish") chrome surface, the dwell time being 9 seconds since the material moves at 10 feet per minute through a 1.5 foot long nip, and 1.5/10 equals 0.15 minute or 9 seconds, the resulting sheet material, which is a useful article of commerce as explained above, now having a permeability value of 8700, a fibrous substrate portion whose density is not much greater than it was at the end of step (7), and a 12.5-mil-thick layer of microporous polymeric composition on top of the woven fabric which layer has a density 11% greater than at the end of step (7), a liquid absorption-rate value of 2.3, a roughness value of 75, a total pore volume of 52.8%, about 57.2% of said pore volume consisting of small pores having an average cross-section diameter of about 0.1–5 microns, about 42.8% of said pore volume consisting of pores having an average cross-section diameter of about 5–100 microns; step (8) has caused a substantial reduction in pore size while causing no undue reduction in the breathability of the sheet material and no undue increase in the density of the porous substrate;

(9) Passing the sheet material through a suitable known type of continuous spray-finishing apparatus and applying to the top surface of the sheet by means of a sprayer 0.18 ounce per square yard (dry basis) of a brown acrylic emulsion primer coat (composition given below) and drying the primer coat in a heat zone at 140° C.;

(10) Applying to the primer-coated surface by means of a sprayer 0.15 ounce per square yard (dry basis) of a brown acrylic emulsion base coated and drying the base coat in a heat zone at 140° C.;

(11) Applying to the base-coated surface of the sheet 0.05 ounce per square yard (dry basis) of a clear top coat and drying the sheet in a heat zone at 140° C., the top coat composition being a 3.4% solution of a 60/40 blend of plasticizer and cellulose acetate butyrate in a blended volatile organic solvent; and

(12) Subjecting the dried finish-coated sheet material to a graining operation by passing it over a roll heated to 160° C. to preheat it and then passing it through an apparatus as described in step (8) above except the roll in contact with the upper surface of the sheet is an embossing roll which has been engraved with a fine leather-like grain pattern; the dwell time is 18 seconds since the material moves at a speed of 5 feet per minute through a 1.5-foot-long nip, and 1.5/5 equals 0.3 minute or 18 seconds; the engraved roll is at a temperature of 160° C. and the sheet material within the nip is under a pressure of 13 p.s.i.g.

The finish-coated and grained sheet material is then cooled to room temperature, and the bottom surface is buffed on a machine commonly used for raising a nap on fabrics, using an emery cloth-covered roll, until a uniform nap is produced. A 0.5 inch wide strip of material is trimmed from both sides of the product.

The coating compositions used in steps (9) and (10) are as follows:

| | Primer, parts | Base coat, parts |
|---|---|---|
| Total solids content | 24.5 | 20.0 |
| Aqueous dispersion of blended acrylic polymers, 34.5% resin solids (an iminated terpolymer of methyl methacrylate, ethyl acrylate and methacrylic acid) | 34.0 | 45.2 |
| Water | 35.8 | 37.2 |
| Aqueous dispersion of blended pigments to provide brown color | 30.2 | 17.6 |

In step (12) the sheet material accepts the grain pattern of the engraved embossing roll with exceptional accuracy and uniformity.

There is substantially no curling up of the edges of the sheet material as it is conveyed from one operation to another following step (8).

The product of Example 1 has a very uniform color and appearance as well as excellent surface smoothness along its entire length and width. It is also highly breathable (permeability value of 3600) and resistant to damage by repeated flexing (flex life of well over 7 million); and it is very soft and porous on the bottom surface. The flex life is determined on the well-known Schiltknecht flex test apparatus described in Bulletin No. 105 published by Alfred Suter, 200 5th Ave. New York City; the result is given as the number of cycles required to cause noticeable damage (e.g., cracking) to the surface of the product when viewed with the unaided eye at a distance of one foot under good lighting. Substantially all of the product passes inspection by a skilled inspector as satisfactory for use in high quality men's dress shoes.

The product of Example 1 is also useful as a breathable upholstery material, praticularly in applications where it is important that (a) the finish-coated material accept the pattern of the embossing roll with maximum accuracy and uniformity, and (b) the product have maximum surface smoothness and uniformity of appearance.

Example 1A

For purposes of comparison, a 4,320-square-foot roll (800 feet by 5.4 feet) of leather-like sheet material is prepared in a manner which is outside the scope of the present invention by repeating Example 1 except step (8) is omitted.

The edges of the sheet material curl up badly as it is passed to and through each of the finishing operations described in steps (9), (10) and (11) of Example 1; this results in non-uniform application of the coats of finishing composition and makes it difficult to transfer the material properly from one location to another even when additional workers and equipment are employed. Also, the surface of the sheet material varies from one area to another in its capacity to absorb the finishing compositions; thus, the color and appearance of the product vary from one area to another. Furthermore, the surface of the finish-coated sheet material varies from one area to another in its capacity to accept the grain pattern of the engraved embossing roll; and many areas of the product have unsatisfactory smoothness after the graining operation. The permeability value of the product of Example 1A is 3300, which is 300 less than that of the product of Example 1.

Twenty percent of the product of Example 1A (864 square feet) fails to pass inspection by a skilled inspector because it does not have satisfactory appearance for use in high quality men's dress shoes.

Example 2

A 4,320-square-foot roll of leather-like sheet material having excellent utility as a shoe-upper material is prepared in accordance with the present invention by repeating Example 1 except step (8) is carried out by subjecting the sheet material to a pressure of 25 p.s.i.g. for a period of 1.25 seconds while at a temperature of 180° C.; this is done by passing the sheet material at a speed of 20 feet per minute over a heated roll until it is heated to 180° C., and then through a 5-inch-long nip formed by a pair of 3-foot-diameter rolls, the upper roll being in contact with the upper surface of the sheet and having a very smooth and lustrous chrome surface, and the lower roll having a 4-inch-thick rubber coating of sufficient resilience to form a 5 inch nip in the area of contact with the upper roll. Since the material moves at 20 feet per minute, or 240 inches per minute, through a 5 inch long nip, the dwell time is 5/240 or 0.0208 minute or 1.25 seconds.

The results obtained in Example 2 are substantially the same as described in Example 1.

I claim:

1. A process for preparing a composite sheet material having utility in the manufacture of breathable shoe-uppers which comprises:
    (A) providing a flexible moisture-permeable sheet material having a permeability value of more than 750 and comprised of a porous fibrous substrate having in superposed adherence therewith a layer of microporous polymeric composition,
    said layer having a total pore volume of about 56–70%, and having about 46–50% of its pore volume composed of pores having an average cross-section diameter of about 0.1–5 microns, and about 50–54% of its pore volume composed of pores having an average cross-section diameter of about 5–100 microns; and
    (B) subjecting said sheet material to a pressure of about 10–35 p.s.i.g. between a pair of pressure members while the sheet material is at an elevated temperature of about 150–190° C. and while the upper surface of the sheet material is in contact with a smooth pressure member
        for a period of about 0.5–15 seconds and until the total pore volume of said layer is reduced to a value of about 40–54%, and said layer has about 53–70% of its pore volume composed of pores having an average cross-section diameter of about 0.1–5 microns, and about 30–47% of its pore volume composed of pores having an average cross-section diameter of about 5–100 microns,
        said pressure being removed before the permeability value of said sheet material falls below 750,
        said layer in step (A) being prepared by (1) providing a liquid polymeric composition comprised of a polymer dispersed in a liquid comprising an organic solvent, and capable of being solidified in situ to form a microporous structure when bathed and dried as described below, (2) applying a layer of said liquid composition onto a substrate, (3) bathing said layer with a liquid coagulant adapted to extract the organic solvent therefrom until substantially all said solvent is extracted, and (4) drying the resulting microporous layer.

2. A process according to claim 2 wherein step (B) is carried out by subjecting the sheet material to a pressure of about 10–14 p.s.i.g. while the sheet material is at a temperature of about 150–170° C. for a period of about 4–15 seconds.

3. A process according to claim 2 wherein step (B) is carried out by subjecting the sheet material to a pressure of about 15–35 p.s.i.g. while the sheet material is at a temperature of about 170–190° C. for a period of about 0.5–3 seconds.

4. A process according to claim 5 wherein step (B) is carried out by passing the sheet material between a pair of pressure rolls, the lower roll in contact with the bottom of the sheet material having a resilient surface and the upper roll in contact with the microporous polymeric composition having a very smooth surface.

References Cited

UNITED STATES PATENTS

| | | | |
|---|---|---|---|
| 3,067,482 | 12/1962 | Hollowell | 117—140(R)X |
| 3,067,483 | 12/1962 | Hollowell | 117—140(R)X |
| 3,100.721 | 8/1963 | Holden | 117—63X |
| 3,157,723 | 11/1964 | Hochberg | 264—284 |
| 3,284,274 | 11/1966 | Hulslander et al. | 117—135.5X |

PHILIP E. ANDERSON, Primary Examiner

U.S. Cl. X.R.

117—135.5, 140; 161—63, 159; 260—2.5, 77.5; 264—41, 284, 331